Figure 4:
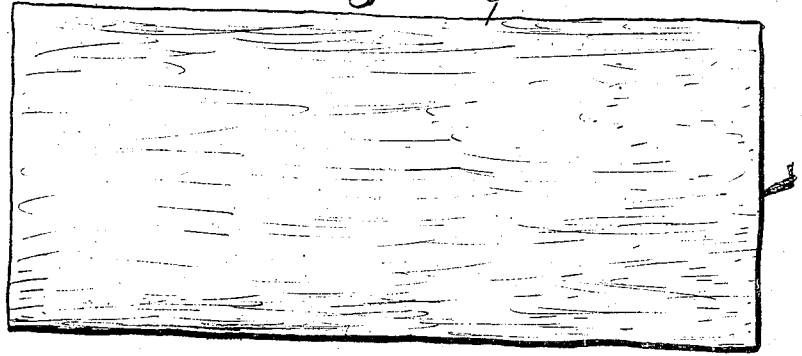

No. 849,178. PATENTED APR. 2, 1907.
T. WALSH.
PROCESS OF TREATING BACON, &c.
APPLICATION FILED MAR. 30, 1906.
2 SHEETS—SHEET 1.
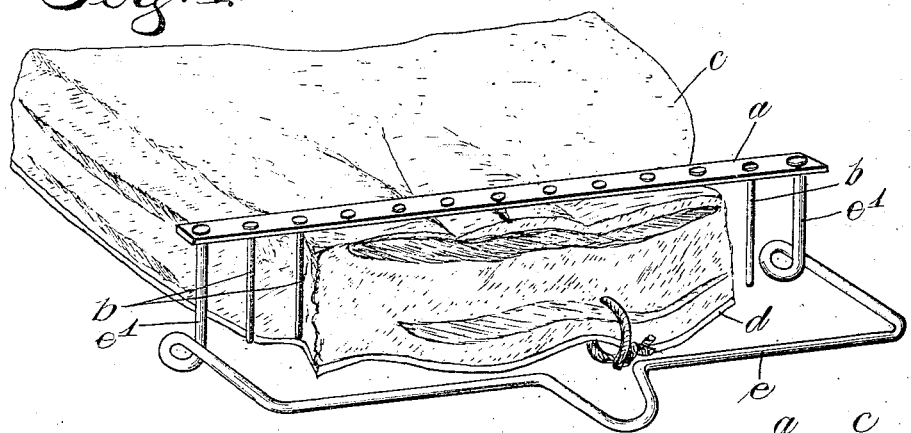
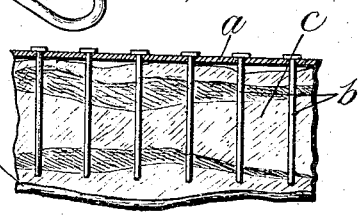
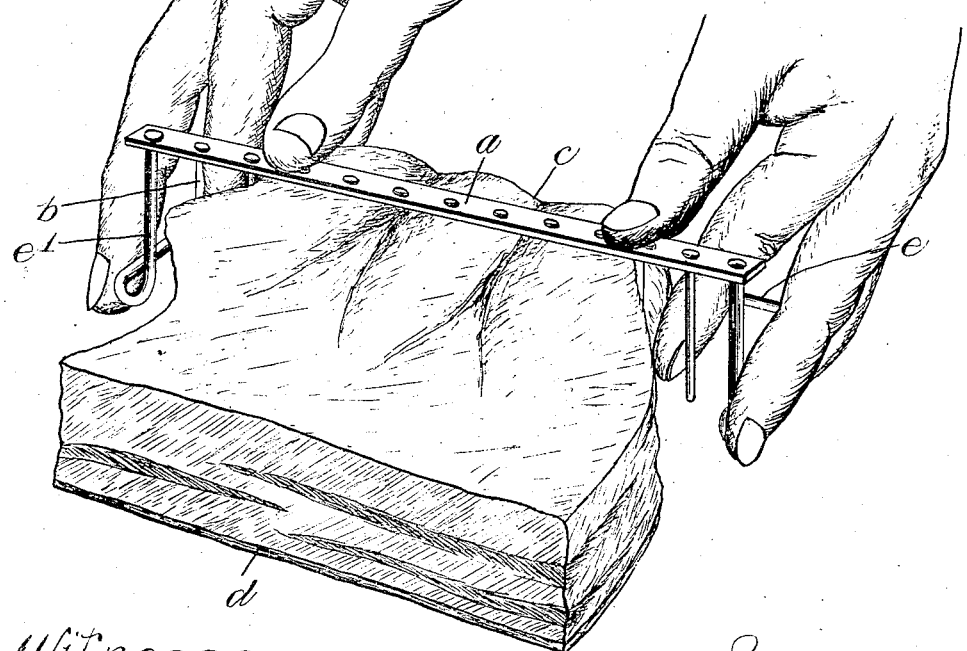

No. 849,178. PATENTED APR. 2, 1907.
T. WALSH.
PROCESS OF TREATING BACON, &c.
APPLICATION FILED MAR. 30, 1906.

2 SHEETS—SHEET 2.

Witnesses:
J B Weir
Robert A Weir

Inventor:
Thomas Walsh,
by Bond Adams Pickard Jackson
his Attys.

UNITED STATES PATENT OFFICE.

THOMAS WALSH, OF CHICAGO, ILLINOIS, ASSIGNOR TO SWIFT AND COMPANY, OF CHICAGO, ILLINOIS, A CORPORATION OF ILLINOIS.

PROCESS OF TREATING BACON, &c.

No. 849,178.

Specification of Letters Patent.

Patented April 2, 1907.

Application filed March 30, 1906. Serial No. 308,901.

*To all whom it may concern:*

Be it known that I, THOMAS WALSH, a citizen of the United States, residing at Chicago, in the county of Cook and State of Illinois, have invented certain new and useful Improvements in the Methods of Treating Bacon and other Analogous Meats, of which the following is a specification, reference being had to the accompanying drawings.

My invention relates to the treatment of bacon in the process of curing it. As is probably generally understood, in the manufacture of bacon the meat is soaked in brine and afterward scrubbed and washed to disseminate the salt as uniformly as possible throughout the meat. At this time it is soft and pliable. It is then hung in a smoke-house and smoked until properly cured. Heretofore various devices have been employed for suspending the meat in the smoke-house during the process of smoking; but they have generally been unsatisfactory, for the reason that the meat when cured has been more or less distorted in shape, owing to the fact that under the conditions to which the meat has been subjected while being smoked the rind and meat have not shrunk or contracted uniformly. This distortion of the meat is quite a serious matter, since it is well recognized that for merchantable purposes it is practically essential that the meat be put up in attractive and well-shaped packages, and for this reason there has been a considerable loss, owing to the necessity of trimming irregular pieces into merchantable shape.

I have discovered a method of treating the meat by which practically all loss due to the necessity of trimming the meat after it has been smoked is avoided, so that as it comes from the smoke-house it is of suitable shape to be put up in packages in the usual way.

It consists in laterally contracting the meat at one end portion of the piece by puckering or other suitable means and applying to the contracted portion suitable means for maintaining it in its contracted condition during the smoking operation, such device for maintaining the puckered or contracted condition of the meat being employed as a means of attaching the suspending devices thereto or being in itself the suspending device.

As a further step my invention includes the application of the device for maintaining the puckered or contracted condition to the flesh side of the meat without penetrating the rind, so that the rind is left free to contract naturally and is not marred by the making of punctures through it. The meat is puckered or laterally compressed to such an extent as to compensate for the natural shrinkage of the rind and of the remainder of the piece, so that when the smoking is completed the meat and the rind at the end where the puckering was done will be of the same width. This width will also correspond with that of the remainder of the piece, since the rind and meat where unconfined will shrink or contract equally. The suspending devices form a part of or are attached to the devices employed to hold the meat in its puckered condition, so that there is nothing to interfere with the proper shrinking of the meat or of the rind. The result is that the bacon when finished is of the rectangular form much esteemed by manufacturers and others and no trimming is required to prepare it for the market. It will of course be understood that the suspending devices are not applied or the meat otherwise held laterally contracted or puckered during the preliminary steps of soaking and scrubbing or washing and that such preliminary steps are not necessarily included in the term "curing" as herein used.

In the accompanying drawings I have illustrated my improved process as applied by the use of my improved hanger; but I wish it to be understood that my present invention is not restricted to the use of the particular form of hanger illlustrated, as it may be practiced by the use of any other suitable form of apparatus.

Figure 5:
Figure 6:
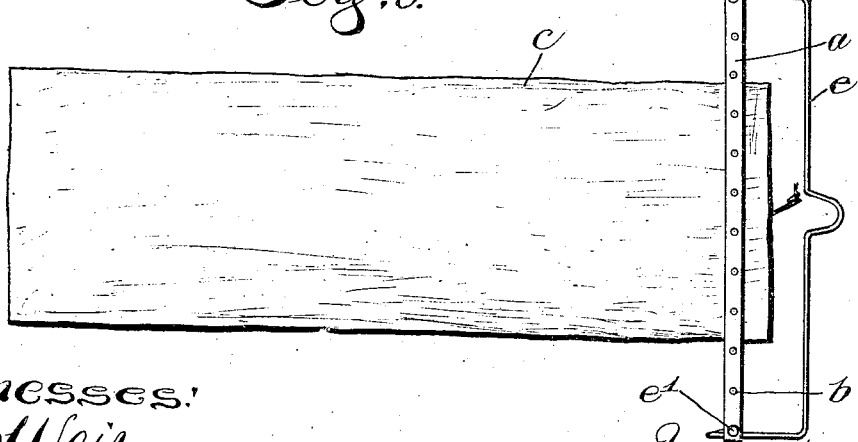

Referring to the drawings, Figure 1 is a perspective view illustrating one end portion of a piece of meat, showing the hanger attached ready for the smoke-house. Fig. 2 is a similar view showing the manner of puckering the meat and the application of the hanger thereto. Fig. 3 is a sectional view illustrating the arrangement of the hanger-teeth in the meat and the fact that the rind is not penetrated. Fig. 4 is a plan view illustrating the shape of the pieces of meat before the hanger is applied thereto. Fig. 5 is a plan view illustrating the meat with the hanger applied ready for the smoke-house, and Fig. 6 is a plan view illustrating the shape of the completed bacon after it comes from the smoke-house and before the hanger is removed.

As will be seen from an inspection of the drawings, and particularly of Figs. 1 to 3, the hanger illustrated comprises a bar $a$, which is of somewhat greater length than the width of an ordinary side of meat to be used in making bacon. Said bar is provided with a number of teeth or pins $b$, which are placed at suitable intervals and are held rigidly by said bar. Said teeth are long enough to extend practically through the flesh part $c$ of the piece; but they do not penetrate the rind $d$, for the reason that their points are made blunt enough so that extraordinary pressure is required to force them into it.

$e$ indicates a bail by which the hanger is suspended, which consists of a wire the intermediate portion of which is parallel with the bar $a$ and lies substantially in the plane of the points of the teeth $b$. The ends $e'$ of the bail are bent at right angles thereto and are connected perpendicularly with the ends of the bar $a$, as shown in Fig. 1.

The method of applying the hanger to the meat is best shown in Fig. 2, from which it will be seen that the operator presses the side edges of one end of the piece of meat together at the same time that he forces the teeth of the hanger into the flesh side of the meat, so that when the hanger is in place the teeth serve to hold the meat in its puckered condition. The rind at the puckered end of the piece is of course puckered also, but it is not punctured, and is free to shrink naturally with the remainder of the rind throughout the piece. The extent to which the meat is puckered is usually about ten per cent. of the width of the meat, although this may be varied considerably, as it should be equal to the lateral shrinkage of the remaining piece. A reduction of the width of the piece by puckering to the extent of ten to twelve per cent. is usually sufficient.

While my improved method is designed primarily for use in the manufacture of bacon, it may also be used in the manufacture of other meat products of similar nature, and the claim is therefore to be construed accordingly.

That which I claim as my invention, and desire to secure by Letters Patent, is—

In the manufacture of bacon, the method of treating meat, which consists in laterally contracting the meat at one end portion of the piece to substantially the width of the balance of the piece after curing, and applying to the contracted portion a device arranged to maintain the meat in its contracted condition during the curing process, leaving the rind free to contract naturally.

THOMAS WALSH.

Witnesses:
I. O. BEATTY,
BEN F. TAIT.